United States Patent [19]

Murata et al.

[11] Patent Number: 5,032,871
[45] Date of Patent: Jul. 16, 1991

[54] GUIDE WITH OBLIQUE RIBS FOR WIPING A MATERIAL

[75] Inventors: Masataka Murata; Kazuma Takeno; Takeshi Shibata; Junichi Inoue, all of Kanagawa, Japan

[73] Assignee: Fuji Photo Film Co., Ltd., Kanagawa, Japan

[21] Appl. No.: 484,285

[22] Filed: Feb. 26, 1990

[30] Foreign Application Priority Data

| Feb. 27, 1989 | [JP] | Japan | 1-43124 |
| Mar. 3, 1989 | [JP] | Japan | 1-50167 |
| Mar. 3, 1989 | [JP] | Japan | 1-50168 |
| Mar. 30, 1989 | [JP] | Japan | 1-76676 |
| Mar. 31, 1989 | [JP] | Japan | 1-78518 |
| Apr. 17, 1989 | [JP] | Japan | 1-96965 |

[51] Int. Cl.$^5$ ............................................. G03G 15/10
[52] U.S. Cl. .................................. 355/256; 118/662; 354/320; 354/338
[58] Field of Search ............... 354/320, 321, 324, 338; 355/256, 255; 118/659–662; 210/167

[56] References Cited

U.S. PATENT DOCUMENTS

| 3,236,168 | 2/1966 | Rautbord et al. | 354/338 |
| 3,263,590 | 8/1966 | Wanielista et al. | 354/338 X |
| 3,375,770 | 4/1968 | Hellyer | 354/321 |
| 3,468,693 | 9/1969 | Hanson | 118/662 X |
| 3,621,773 | 11/1971 | Limberger et al. | 354/338 X |
| 3,626,832 | 12/1971 | Kappeler et al. | 354/324 X |
| 3,636,925 | 1/1972 | Reuter, Jr. et al. | 118/662 X |
| 3,651,782 | 3/1972 | MacDonald, Jr. | 355/256 X |
| 3,990,088 | 11/1976 | Takita | 354/324 X |
| 4,794,415 | 12/1988 | Larsen | 354/320 X |

Primary Examiner—A. T. Grimley
Assistant Examiner—William J. Royer
Attorney, Agent, or Firm—Sughrue, Mion, Zinn, Macpeak & Seas

[57] ABSTRACT

An image forming solvent applying device for applying an image forming solvent, for example, water, to a recording material whereby the recording material is immersed in the image forming solvent and bubbles or dust are wiped from the surface of the recording material. The solvent is supplied into a lower guide member which cooperates with an upper guide member to guide the recording material through the solvent. The two guide members each have a plurality of ribs extending obliquely with respect to a direction of movement of the recording material such that the ribs wipe the entire area of the recording material at least once as viewed in a widthwise direction of the recording material perpendicular to its direction of movement as it is conveyed along the ribs.

19 Claims, 7 Drawing Sheets

GUIDE WITH OBLIQUE RIBS FOR WIPING A MATERIAL

BACKGROUND OF THE INVENTION

The present invention relates to an image forming solvent applying device in which a recording material is immersed in an image forming solvent so as to be coated with the latter.

An image forming device is known in the art in which an image is formed by exposing a photosensitive material to a light beam reflected from or passed through an original or a light beam obtained by photoelectric conversion of electrical signals. In addition, another image forming device is known in the art in which an image formed on a photosensitive material is transferred onto an image receiving material.

For some recording materials such as photosensitive materials and image receiving materials, it is necessary to apply an image forming solvent such as water. For this purpose, an image forming solvent applying device is used to coat a recording material with an image forming solvent.

In one example of an image forming solvent applying device, a recording material is coated with an image forming solvent using a roller bearing the solvent. In another example of such an apparatus, a recording material is immersed in an image forming solvent, and the excess image forming solvent is removed therefrom.

In the case of the latter image forming solvent applying apparatus, when the solvent is supplied into the solvent vessel, air may be mixed in the form of bubbles with the solvent. If the bubbles are larger than about 3 mm in diameter, frequently they float in the solvent or stick to the inner wall of the solvent vessel or to a recording material guide member.

When air bubbles stick to the recording surface of the recording material, the parts of the recording surface to which the air bubbles have been stuck are not coated with the image forming solvent; that is, the recording material is not completely coated with the image forming solvent. Even if the recording material is subjected to an image forming treatment, no image is formed in such parts. If the material is a positive recording material, then the resultant image will have white bubble-like spots. That is, if the image forming treatment is carried out with such air bubbles stuck to the recording surface of the recording material, then the image formed thereon will be defective.

In the case where the guide member for guiding the recording material in the solvent has a protrusion extending in the guiding direction so as to prevent the adhesion of the guide member to the recording material, the stress applied to the recording material is not uniform in distribution because the same part of the recording material is brought into sliding contact with the protrusion. Therefore, if the recording material is a photosensitive material, after it is developed, its density will be increased by pressure sensitization or decreased by pressure desensitization, and hence the resultant image is unsatisfactory.

SUMMARY OF THE INVENTION

Accordingly, an object of the invention is to eliminate the above-described difficulties accompanying a conventional image forming solvent applying device. More specifically, an object of the invention is to provide an image forming solvent applying apparatus in which, in an image forming solvent applying operation, a recording material is guided in such a manner that it is free from dust and air bubbles, and the stress applied to the material is uniformly distributed.

The foregoing and other objects of the invention have been achieved by the provision of an image forming solvent applying device for applying an image forming solvent to a recording material by immersing the recording material in the image forming solvent, in which, according to the invention, a guide member for guiding the recording material in the solvent has ribs which are arranged in such a manner that the ribs extend obliquely with respect to the direction of movement of the recording material and are allowed to wipe the whole area of the recording material at least once as viewed in the widthwise direction of the recording material (the direction perpendicular to the direction of movement of the recording material), and the ribs have end portions which are designed so as to be brought into sliding contact with the recording surface of the recording material.

That is, as the recording material is moved, the entire recording surface thereof is brought into sliding contact with the end portions of the ribs formed on the guide member. Hence, even if air bubbles or dust stick to the recording surface of the recording material, they are removed from the recording surface by the ribs of the guide member.

Accordingly, since the recording surface of the recording material is, in its entirety, coated with the image forming solvent, the resultant image is excellent in picture quality.

As used herein, the term "image forming solvent" is intended to mean any solution in which the recording material is immersed in order to form an image thereon. The term thus includes ordinary image forming solvents, developing solutions, bleaching solution, bleaching fixing solutions, and fixing solutions for thermal developing and transferring photosensitive materials.

The recording material may be any one which is coated with an image forming solution to form an image on it. Examples of the recording material are a photosensitive material and image receiving material which are subjected to image developing and transferring with an image forming solvent applied thereto.

Examples of the photosensitive material are black-and-white photographic photosensitive materials, X-ray photographic photosensitive materials, photomechanical photosensitive materials, conventional color photographic photosensitive materials, (negative films, reversal films, color printing papers, etc.), color diffusion transfer photosensitive materials, and heat developable photosensitive materials, each using silver halides Examples of such thermal developing photosensitive material have been disclosed in U.S. Pat. Ser. Nos. 4,4763,079, 4,474,867, 4,478,927, 4,507,380, 4,500,626, and 4,483,914, and Japanese Published Unexamined Patent Applications Nos. 149046/1983, 149047/1983, 1562440/1984, 154445/1984, 165054/1984, 180548/1984, 168439/1984, 174832/1984, 174833/1984, 174834/1984, 174835/1984, 232451/1986, 65038/1987, 253159/1987, and 13546/1989, and European Laid-Open Patent Applications Nos. 210,660A2 and 220,746A2.

The above-described heat developable photosensitive materials are basically comprised of a support having thereon photosensitive silver halides, binders, dye providing compounds and reducing agents (the dye providing compounds serving also as a reducing agent as the case may be). If necessary, it may contain organic silver salt or other additives.

The above-described heat developable photosensitive materials provide negative images when exposed. However, heat developable photosensitive materials which provide positive images can be used as well. In the latter case, there are available a mode in which a direct positive emulsion is employed as a silver halide emulsion (the system being practiced in two ways, one using a nucleating agent and the other a light fogging positively releasing mode) and a mode in which a dye providing compound capable of a diffusible dye image is used.

A variety of methods for transferring a diffusible dye are available. In a first method, the image is transferred into a dye fixing layer using an image forming solvent such as water. In the second method, high boiling point organic solvent is used to transfer the image into a dye fixing layer. In a third method, a hydrophilic thermal solvent is employed. In a fourth method, the thermal diffusibility or sublimation of a diffusible dye is utilized to transfer the dye into a dye fixing layer having a dye receiving polymer. Any one of the above-described methods may be applied in the invention.

The image forming solvent may be water, for instance, including not only purified water but also ordinary tap water. Furthermore, the image forming solvent may be a mixed solvent of purified water and a low boiling point solvent such as methand, DMF, acetone, or diisobutyl ketone. In addition, it may contain an image forming accelerator, antifoggant, development stopping agent, or hydrophilic thermal solvent.

DESCRIPTION OF THE PREFERRED EMBODIMENTS

Preferred embodiments of the invention in the form of an image forming solvent applying device will be described with reference to the accompanying drawings.

Figure 1:
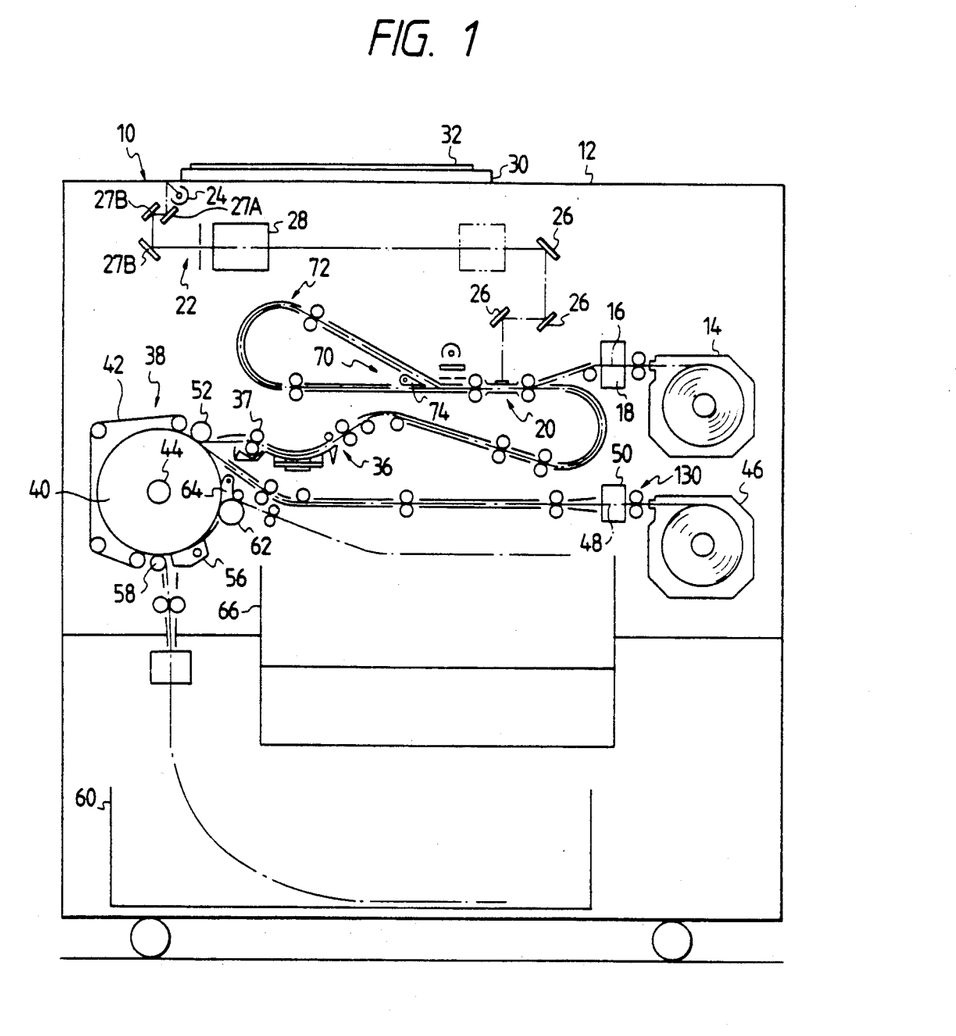
FIG. 1 is an explanatory diagram showing the overall arrangement of an image forming apparatus.

FIG. 1 is an explanatory diagram showing the arrangement of an image forming apparatus 10 employing an image forming solvent applying device constructed according to the invention.

As shown in FIG. 1, a photosensitive material magazine 14 is mounted on the frame 12 of the image forming apparatus 10. A photosensitive material 16 wound in the form of a roll is loaded in the magazine 14. The photosensitive material 16 is comprised of a support having thereon photosensitive silver halides, binders, dye providing substances, and reducing agents.

A cutter 18 is arranged near the magazine 14 to cut the photosensitive material 16 pulled out of the magazine to a predetermined length to provide a piece of photosensitive material. The photosensitive material 16 thus provided is conveyed to an exposing section 20.

An exposing unit 22 is provided immediately above the exposing section 20. The exposing unit 22 includes a main unit, namely, a main exposing light source 24, a plurality of stationary mirrors 26; a first movable mirror 27A which is moved together with the light source 24, second movable mirrors 27B which are movable relative to the first movable mirror 27A, and a lens unit 28. An original stand 30 is provided on an apparatus frame 12 in such a manner that it is located above these components of the exposing unit 22. The light source 24, the first movable mirror 27A, and the second movable mirrors 27B are movable parallel to the original stand 30. The output light beam of the light source 24 is applied directly to an original 32 on the original stand 30.

A branching section 70 and a turn-over section 72 are arranged downstream of the exposing section 20 (on the left side of the exposing station in FIG. 1).

The branching section 70 has a flapper 74. The flapper 74 swings into a selected one of the two photosensitive material conveying paths provided for conveyance of the photosensitive material 16 so as to determine the photosensitive material conveying path along which the photosensitive material 16 is to be conveyed. Immediately after being pulled out of the photosensitive material magazine, the photosensitive material 16 is guided to the upper photosensitive material conveying path in FIG. 1. The photosensitive material 16 thus guided is turned over in the turn-over section 72 and delivered to the exposing section 20 so that the photosensitive surface of the photosensitive material faces upward in FIG. 1.

The exposure of the photosensitive material 16 is carried out as follows: While the light source 24 and the first movable mirror 27A are being moved, the second movable mirrors 27 are moved at a predetermined speed in association with the movement of the light source and the first movable mirror so that the output light beam of the light source is applied to the original 32, and the light beam reflected from the latter is applied, in a scanning mode, to the photosensitive material 16 at the exposing section 20. By changing the speed of the second movable mirrors 27 following the light source and the first movable mirror, the image recording magnification can be controlled. In the case of the above-described image forming apparatus, X1 magnification can be obtained with the speed of the second movable mirrors 27B set to half that of the light source 24.

The photosensitive material 16 thus exposed is turned over and delivered to a water applying section 36, where it is wetted with an image forming solvent, which is water in this case.

A pair of squeeze rollers 37 are provided at the water applying station 36 to remove excess water from the photosensitive material 16.

A thermal developing and transferring unit 38 is arranged beside the pair of squeeze rollers 37. The unit 38 includes a heating drum 40 and an endless belt 42 abutted against the latter.

The surface of the heating drum 40 is preferably coated with Teflon. A halogen lamp 44 is mounted inside the heating drum 40 so as to heat the cylindrical wall of the drum to about 90° C.

The endless belt 42 can be made of a heat-resistant material of aromatic polyamide fibers, for instance Kevlar or Nomex (trade names of DuPont Company) which is coated with silicone rubber containing carbon. Therefore, the endless belt 42 is electrically conductive.

An image receiving material magazine 46 is arranged below the photosensitive material magazine. An image receiving material 48 is loaded in the form of a roll in the magazine 46. The image receiving material 48 has an image forming surface which is coated with a coloring matter fixing material containing mordant.

A cutter 50 is provided near the image receiving material magazine 46 to cut the image receiving material 48, which is pulled out of the magazine 46 to a predetermined length to provide a piece of image receiving material 48. The image receiving material 48 thus provided is delivered to the thermal developing and transferring unit 38.

A piling roller 52 is disposed upstream of the endless belt 42, as viewed in the material supplying direction, close to the upper surface of the heating drum 40. The piling roller 52 operates to stack the photosensitive material 16 and the image receiving material 48 one on another and to push these materials 16 and 48 thus piled against the cylindrical wall of the heating drum 40. As a result, the materials 16 and 48, while being held between the endless belt 42 and the heating drum, are turned about two-thirds of the circumference of the heating drum 40 while being subjected to thermal developing. In this operation, the photosensitive material 16 exudes transferring coloring matter, which is transferred to the coloring matter fixing layer of the image receiving material 48 to form the desired image.

A separating pawl 56 is disposed downstream of the endless belt 42, as viewed in the material supplying direction, in such a manner that it is close to the lower surface of the heating drum 40. A separating roller 58 is arranged between the separating pawl 56 and the endless belt 42.

The end of the separating pawl 56 is normally held in contact with the heating drum 40. Therefore, when the photosensitive material 16 is delivered to the separating pawl 56, the end of the latter is engaged with the front edge of the photosensitive material 16 to separate the material 16 from the image receiving material 48 stuck on the cylindrical wall of the heating drum 40. On the other hand, the separating roller 58 pushes the photosensitive material 16 against the heating drum 40, and guides the photosensitive material which has been separated from the heating drum by the separating pawl 56 while curving it downwardly. The photosensitive material 16 thus separated is delivered into a waste (used) photosensitive material receiving box 60 provided below the heating drum 40.

Under this condition, the image receiving material 48 still remains on the cylindrical wall of the heating drum 40. In order to separate the image receiving material 48 from the heating drum, another separating roller 62 and another separating pawl 64 are arranged above the separating pawl 56 in such a manner that they are close to the heating drum. The image receiving material 48 separated from the heating drum 40 is delivered into a tray 66 so as to be stacked there.

Figure 2:
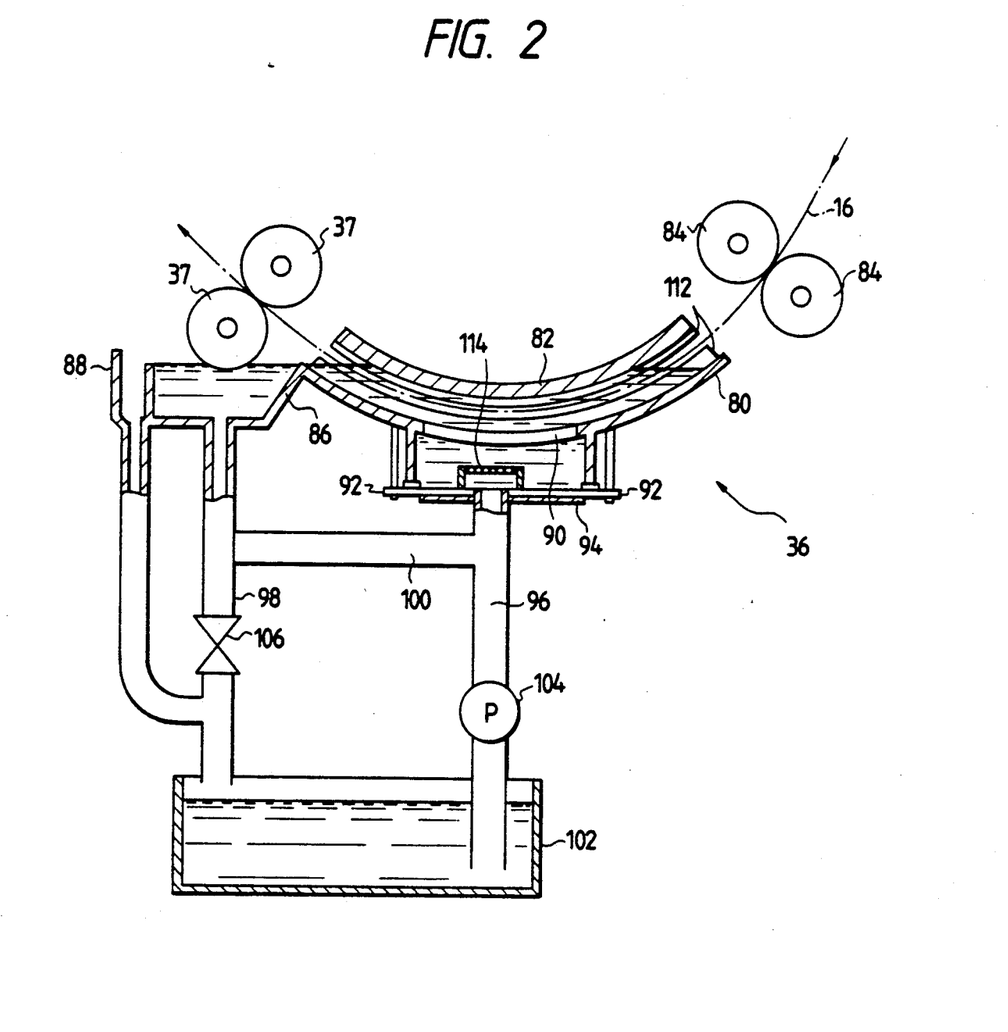
FIG. 2 is a sectional diagram showing the arrangement of a water applying section.

FIG. 2 is a sectional view showing the water applying section 36 in detail.

As shown in FIG. 2, a photosensitive material conveying path is formed by an upper guide member 82 and a lower guide member 80 which are spaced from each other to provide a predetermined gap therebetween. The lower guide member 80 is curved so as to hold water, and has ribs 112. The upper guide member 82 is also curved and has ribs 112. A pair of conveying rollers 84 are provided upstream of the photosensitive material 16 into the gap between the upper and lower guide members. The aforementioned pair of squeeze rollers 37 are arranged downstream of the photosensitive material conveying path to remove excess water from the photosensitive material 16 which has been swelled from being immersed in water. The lower guide member 80 is integral with a water vessel 86 for immersing a part of the pair of squeeze rollers 37, and with an overflow vessel 88 for receiving water flowing over the water vessel 86.

Water is supplied into the lower guide member 80 through holes 90 formed in the bottom of the latter. An aluminum plate 92 is provided water-tightly below the lower guide member 80. The aluminum plate 92 is equipped with a heater 94 so that the temperature of the water is maintained at about 35° C. The aluminum plate 92 is connected to a pipe 96 for supplying water to the lower guide member 80. The water vessel 86 has a pipe 98 through which water is supplied into the water vessel 86. These pipes 96 and 98 are communicated with each other through a bypass pipe 100. The water in a tank 102 is supplied through the pipes 96 and 98 to the lower guide member 80 and the water vessel 86. The water thus supplied can be returned into the tank 102 by opening an electromagnetic valve 106.

The open end of the pipe 96, through which water is supplied to the lower guide member 80, is covered with a filter 114 so that the problem of air bubbles or dust mixed in the water entering the lower guide member is prevented.

Before the image forming apparatus operates, water is put in the tank 102. Upon the start of the image forming apparatus, the water is supplied into the lower guide member 80 and the water vessel 86 by the pump 104. The level of water is determined by adjusting the height of the overflow wall of the water vessel 86 so that the bottom of the upper guide member 82 is in contact with the water surface.

The photosensitive material 16 delivered into the gap between the upper and lower guide members 82 and 80 by the pair of conveying rollers 84 is guided into the water by the upper and lower guide members 80 and 82 and swelled therein, and then squeezed by the pair of squeeze rollers 37 so that excess water is removed from the photosensitive material 16; that is, a suitable quantity of water is applied to the material 16.

Figure 3:
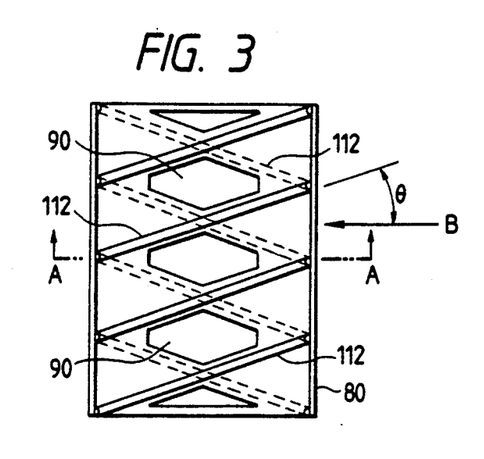
FIGS. 3 and 4 are a plan view and a sectional view, respectively, showing an example of a lower guide member.
Figure 4:
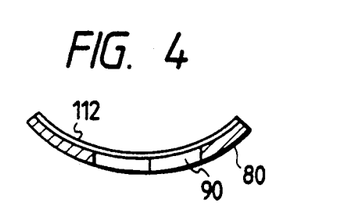
Figure 5:
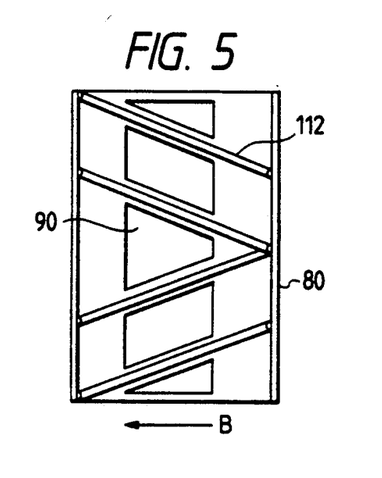
FIGS. 5 through 8 are plan views showing other examples of lower guide members.
Figure 6:
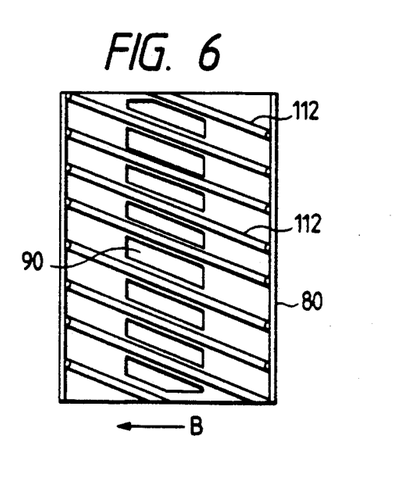
Figure 7:
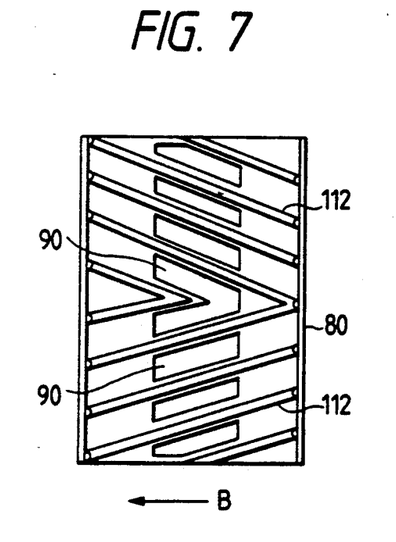
Figure 8:
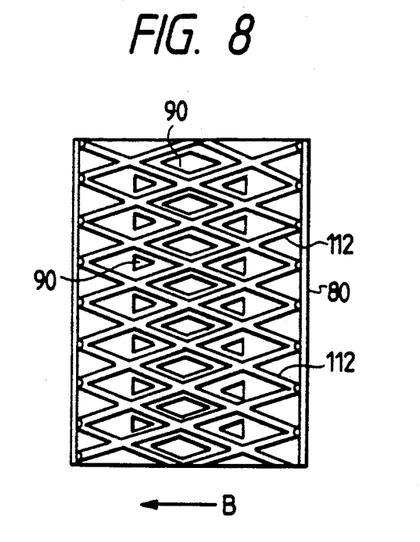

FIG. 3 is a plan view of the lower guide member 80, and FIG. 4 is a sectional view taken along a line A—A in FIG. 3.

The lower guide member 80 has the ribs 112 which are brought into contact with the exposed surface of the photosensitive material 16. The ribs 112 extend in such a manner as to form a predetermined angle $\theta$ with the direction of conveyance of the photosensitive material 16 or the direction of the arrow B. It is desirable for the angle $\theta$ to be smaller than 45°. With the angle $\theta$ set to less than 45°, the photosensitive material 16 is conveyed smoothly while being in contact with the ribs 112. The holes 90 for supplying water are formed between the ribs 112. The ribs 112 are arranged in such a manner that they are positioned at suitable intervals, and the right and left ends of adjacent ribs are on the same straight lines extending in the direction of conveyance of the photosensitive material. For instance, the right end of a rib and the left end of the rib located immediately above it lie on the same straight line extending in that direction.

When the photosensitive material 16 is delivered into the gap between the upper and lower guide members, it is brought into sliding contact with the ribs 112 being bent under its own rigidity. When the photosensitive material 16 is conveyed through the gap between the upper and lower guide members in this manner, the exposed surface of the photosensitive material 16 is brought into contact with the ribs 112. Hence, even if air bubbles or dust are adhered to the exposed surface of the photosensitive material 16 immersed in the water, the air bubbles or dust are removed therefrom by the ribs 112 because the latter are brought slidably into contact with the exposed surface of the photosensitive material.

In the above embodiment, the ribs extend as if they were straight when viewed from above; however, they may extend arcuately.

In the above embodiment, each of the ribs 112 is about 2 mm in height and about 7 cm in length. The ribs 112 are formed integrally with the lower guide members using a thermoplastic resin such as ABS resin, polycarbonate, polyethylene terephthalate, methacrylic resin, vinyl chloride resin, styrene resin, polyethylene resin, polypropylene resin, or Teflon, or a metal such as stainless steel or aluminum. The ribs 112 may be semicircular, triangular or rectangular in section. However, in order to protect the photosensitive material 16 from damage, it is preferable that the ribs be semicircular in section.

Ribs 112 similar to those described above may be added as indicated by dotted lines in FIG. 3.

The arrangement of these ribs 112 is not limited to that shown in FIG. 3. That is, the ribs may be arranged as shown in FIGS. 5 through 8.

FIGS. 5 through 8 are plan views showing examples of the lower guide member 80 which differ from one another in the arrangement of the ribs 112. In these FIGURES, the photosensitive material conveying direction is indicated by the arrow B. In the case of the lower guide member 80 shown in FIG. 5, its whole surface is in contact with the ribs 112 at all times. In the case of the lower guide member 80 shown in FIG. 6 or 7, its whole surface is brought into contact with the ribs 112 twice. In the case of the lower guide member 80 shown in FIG. 8, its whole surface is brought into contact with the ribs 112 two to four times.

The air bubbles or dust are positively removed from the exposed surface of the photosensitive material 16 in proportion to the number of times of bringing the entire surface of the photosensitive material into contact with the ribs 112.

Figure 9:
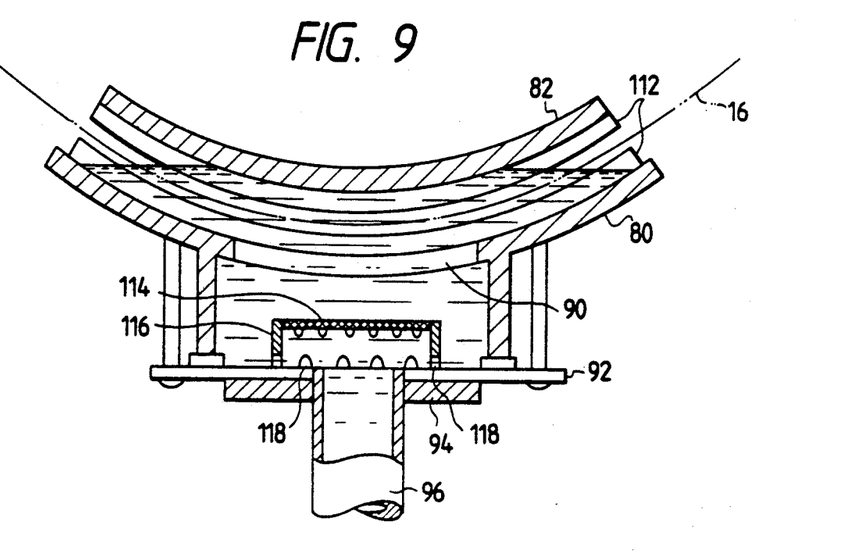
FIG. 9 is an explanatory diagram showing the guide member and its relevant components in detail.

The filter 114 provided at the water applying section 36 will be described. FIG. 9 shows the guide members and their related components in detail. A filter 3 mm or less in mesh diameter is provided between the guide member and the solvent supplying outlet of the image forming solvent vessel.

The filter 114 is fixedly secured to the upper end of a member 116 circular or rectangular in section, which is mounted over the outlet of the pipe 96. The hollow member 116 has cuts 118 in its lower end portions.

Sometimes, air bubbles may be mixed in the water supplied through the pipe 96. If the air bubbles adhere to the photosensitive material 16, then no water will be applied to the corresponding parts of the photosensitive material 16. The filter 114 disposed below the lower guide member is 0.1 mm in mesh diameter so that it can block air bubbles larger than 0.1 mm in diameter. The air bubbles thus blocked are broken into smaller bubbles which can pass through the filter 114. However, even if such small air bubbles (smaller than 0.1 mm in diameter) stick to the photosensitive material 16, they will not adversely affect the formation of an image on the photosensitive material 16. Strictly stating, in this case too, no water is applied to the bubble-containing parts of the photosensitive material 16, as a result of which those parts will be unsatisfactory in coloring. However, in practice no defects can be visually detected; that is, the resultant image is acceptable. This is probably because water spreads itself into the bubble-containing parts of the photosensitive material, thus coating the latter uniformly.

The mesh diameter of the filter 114 is preferably 3 mm or less, more preferably 0.5 mm or less, and most preferably 0.1 mm or less.

When a number of air bubbles are detained by the filter 114, a layer of air is formed under the filter 114, as a result of which the water cannot pass through the filter 114. However, the water can be supplied through the cuts 118 formed in the lower end portion of the hollow member 116.

The filter 114 may be in the form of a metal such as aluminum, iron, stainless steel or copper, a synthetic resin such as polystyrene, polyvinyl chloride, polyvinylidene chloride or polyethylene terephthalate, or a natural material such as paper, wood, cotton or wool. The filter 114 is made of a plate or fibers of the above-described materials.

In the case of forming the filter 114 using a plate, the meshes are formed by blanking or etching. The meshes are preferably circular. However, the invention is not limited thereto or thereby.

In the case of forming the filter 114 using fibers, the fibers are provided in the form of a piece of net, mesh or textile.

The following products manufactured by NBC Kogyo Co., Ltd., may be used as the filter 114:

| Product | Mesh diameter | Material |
| --- | --- | --- |
| #180 | 0.096 mm | stainless steel |
| #80 | 0.196 mm | stainless steel |
| T-No. 200S | 0.082 | polyester |
| T-No. 100T | 0.183 | polyester |
| NMG 84 | 0.200 | nylon |
| NXX 13 | 0.098 | nylon |

Figure 10:
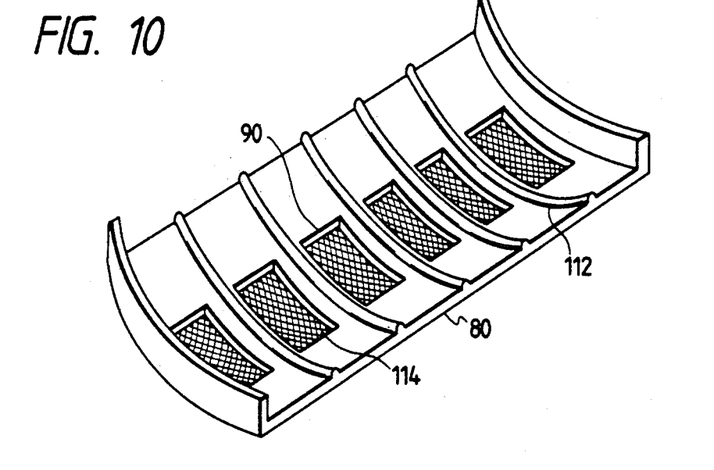
FIG. 10 is a perspective view of the lower guide member.

FIG. 10 is a perspective view showing an example of the lower guide member 80 and showing a modification of the filter 114.

The lower guide member 80 has ribs 112, between which holes 90 are formed. The filter 114 is provided under the lower guide member 80 in such a manner as to cover the holes 90. Hence, air bubbles are removed by the filter 114 from the water supplied into the lower guide member 80 through the holes 90.

The filter 114, which is 3 mm or less in mesh diameter, is disposed between the solvent supplying outlet and the lower guide member 80, as described above. Therefore, air bubbles larger than 3 mm in diameter, which, if adhered to the photosensitive material 16, would adversely affect the picture quality of an image formed thereon, are blocked by the filter 114. That is, no large air bubbles will adhere to the photosensitive material 16. Hence, the recording surface of the photosensitive material 16 is coated, in its entirety, with the image forming solvent, and accordingly the resultant image is free from defects attributed to the presence of air bubbles. As a result, the material is satisfactory in picture quality.

A pair of nip rollers 130 will now be described which operate to convey the image receiving material 48.

Figure 11:
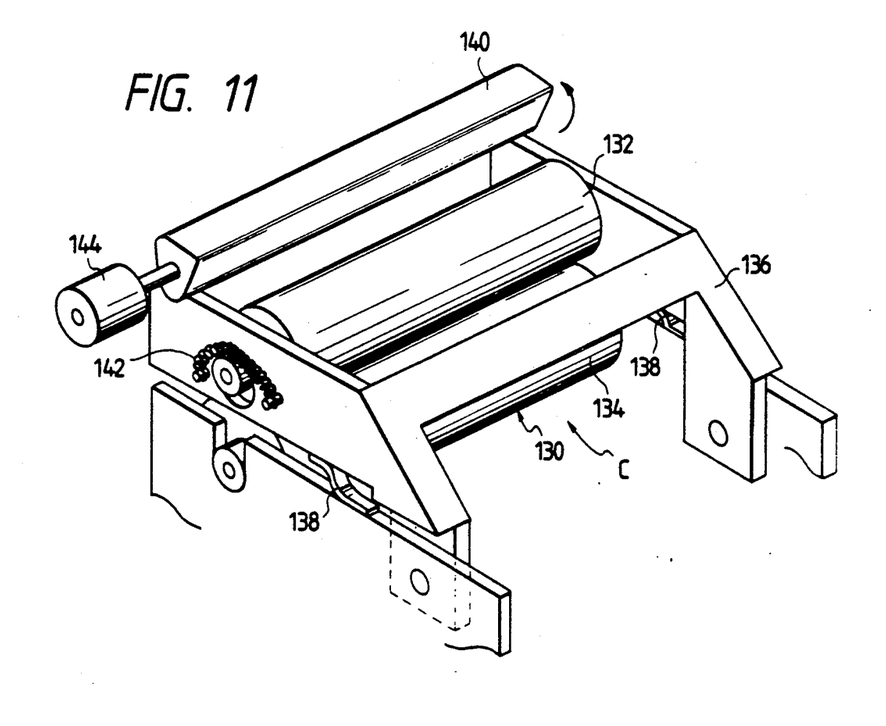
FIG. 11 is a perspective view showing nip roller engaging and disengaging members.

FIG. 11 is a perspective view showing the manner of engaging and disengaging the pair of nip rollers 130 provided at the outlet of the image receiving material magazine 46.

The image receiving material 48 is pulled out of the image receiving material magazine 46 and conveyed by the pair of nip rollers 130 in the direction of the arrow C. The length of the nip rollers 130 is substantially equal to the width of the image receiving material 48. The pair of nip rollers 130 is composed of a first nip roller 132 made of polyacetal resin and positioned on one side of the image receiving material 48, the image receiving surface, and a second nip roller 134 made of silicon rubber and positioned on the other side of the image receiving material 48.

Both ends of the first nip roller 132 are rotatably supported by a swing arm 136, which is urged clockwise (as shown in FIG. 11) by leaf springs 138 at all times. A rotatable cam 140 for fixing the arm is provided above the arm 136. The cam is turned clockwise in FIG. 11 so that it is abutted against the upper portion of the arm 136. As a result, the arm 136 is moved towards the second nip roller 134, whereby the first nip roller 132 is abutted against the second nip roller 134 to hold the image receiving material 48 therebetween.

A pair of coil springs 142 are provided at the two end portions of the first nip roller 132 so that when the first nip roller 132 abuts against the second nip roller 134, a load of 2 to 3 kg is applied to both ends of the first nip roller 132.

The arm fixing cam 140 is connected to an electric motor 144 to be turned thereby. When the top of the cam 140 is in contact with the upper portion of the arm 136 as shown in FIG. 11, the first nip roller 132 is abutted against the second nip roller 134. When the side of the cam 140 is abutted against the upper portion of the arm 136 by turning the cam 140 counterclockwise in FIG. 11, the first nip roller 132 is disengaged from the second nip roller 134 by the elastic forces of the leaf springs 138.

The operation of the electric motor 144 is controlled by a control unit (not shown). More specifically, the control unit controls the electric motor 144 as follows: When the conveyance of an image receiving material 48 is suspended, the control unit operates the motor 144 to turn the cam 140 counterclockwise to cause the first nip roller 132 to disengage from the second nip roller 134. When the next image receiving material 48 is conveyed, the control unit operates the motor 144 to turn the cam 140 clockwise before the conveyance of the image receiving material 48 so that the first nip roller 132 is abutted against the second nip roller 134.

The motor 144 may be operated in synchronization with the start and stop of the conveyance of the image receiving material 48. That is, the control unit can operate the motor 144, for instance, in response to a cutter operation signal provided by the cutter 50 or a detection signal provided by a sensor for detecting the amount of movement of the image receiving material 48.

When the image receiving material 48 is not being conveyed, it is merely placed on the second nip roller 134, because the motor causes the cam 140 to fix arm 35 with the first nip roller 132 disengaged from the second nip roller 134. That is, the image receiving material 48 is held free from the nip rollers 130 until the conveyance is started again, and accordingly it will not be deformed or damaged by the nipping pressure of the nip rollers 130.

The first nip roller 132 is made of polyacetal resin, as described above. Therefore, although the image forming material 48 is conveyed while being nipped by the pair of nip rollers 130, its image receiving surface is not adversely affected; that is, no traces of the nipping and conveying operations are formed on it.

On the other hand, for comparison, a plurality of image forming materials 48 were conveyed, while being nipped with a plurality of first nip rollers 132 made of styrene-butadiene rubber, chloroprene rubber, silicone rubber, phenolic resin, stainless steel or aluminum In this case, traces were found: on the image forming surfaces due to the image receiving material conveying operation.

Thus, it is preferable that at least the part of the cylindrical wall of the first nip roller 132 which is brought into contact with the image receiving material 48 be covered with a layer of polyacetal resin.

In the above-described embodiment, the arm 136 is fixedly positioned by means of the cam 140. Instead, a solenoid may be employed to operate the arm 136 or the nip rollers 130 thereby to control the engagement and disengagement of the latter.

As described above, the nip rollers has means for releasing the image receiving material when it is not being conveyed, and at least the part of the cylindrical wall of the first nip roller which is brought into contact with the image receiving material is made of polyacetal resin. This minimizes the effects on the image receiving material of the nipping pressure of the nip rollers being applied for a long period of time, thus eliminating the difficulty that the image receiving material is creased when nipped by the nip rollers.

Thus, the desired image can be formed on the entire image receiving surface of the image receiving material with high picture quality, satisfactory both in coloring and in image transfer, and free from deformation.

The polyacetal resin forming the first nip roller may be a homopolymer or copolymer. The homopolymer molecular structure is a long chain polymer ($-CH_2O-$)$_n$ of polyoxyrmethylene with no side chain having generally more than one thousand $CH_2O$ radicals, for instance, Dellin manufactured by DuPont Company. The polyacetal resin copolymer is such that a ($-C-C-$) bond is included in the polyoxymethylene main chain, for instance, Duracon manufactured by Cellanese Company.

The above-described means for engaging and disengaging the nip rollers 130 provided for the image receiving material supplying section may be provided for other nip rollers in the photosensitive material supplying section and other conveying systems.

The removal of dust, etc., from the image receiving material 48 will now be described.

Figure 12:
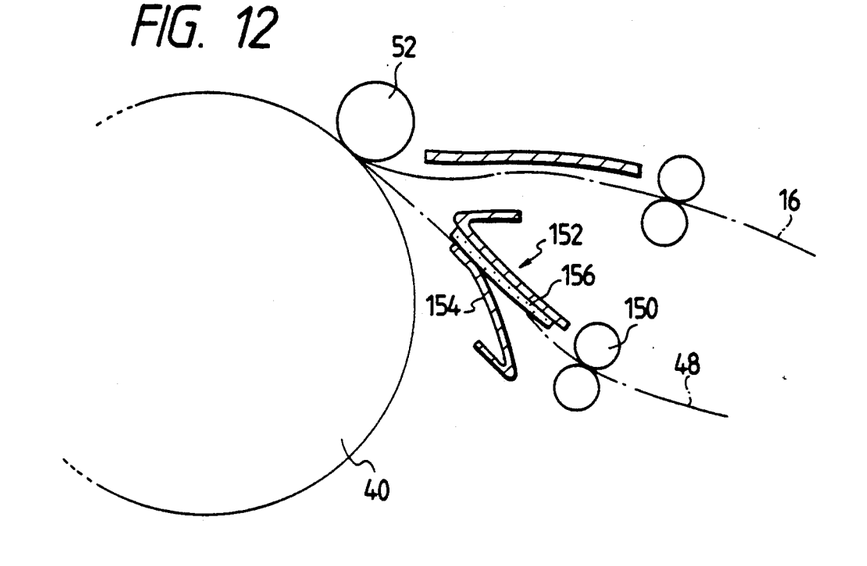
FIG. 12 is an explanatory diagram showing a piling roller and its relevant components.

FIG. 12 is an explanatory diagram showing the piling roller 52 and related components.

A pair of rollers 150 are arranged in the path of conveying the image receiving material 48, which has been cut to a predetermined length by the cutter 50. A guide board 152 and a spring guide 154 are disposed between the pair of rollers 150 and the piling roller 52 to lead the image receiving material 48 to the piling roller 52.

An element for wiping dust off the image receiving material, which is a textile 156 of polyester fibers, for instance, is bonded to the contact surface of the guide board 152 which is brought into contact with the image receiving material 48. The delivered image receiving material 48 is lightly pushed against the textile 156 by the spring guide 154 so that it is slidably brought into contact with the textile 156. As a result, dust, etc., is wiped from the image receiving surface of the image receiving material 48.

Immediately after passing the guide board 152, the image receiving material 48 is piled on the photosensitive material 16, and is then pushed against the heating drum 40 by the piling roller 52. Therefore, no dust, etc, will remain adhered to the image receiving surface again.

The textile is formed by plain-weaving or weaving three dimensionally yarns formed by twisting synthetic fibers. The diameter of the fibers is preferably 10 $\mu$m or less, more preferably 3 $\mu$m.

A textile whose synthetic fibers are 10 $\mu$m or less can substantially completely wipe off dust or powder formed when the image receiving material is cut. Furthermore, because a textile formed using yarns obtained by twisting synthetic fibers is high in frictional resistance, it will retain the fiber dust.

Examples of suitable fibers for forming the textile 156 are acrylic fibers, acetate fibers, Aramid fibers, copper ammonia fibers, nylon fibers, Novoloid fibers, vinylidene fiber, vinylon fibers, fluorine fibers, polyacetal fibers, polyurethane fibers, polyester fibers, polyethylene fibers,; polyvinyl chloride fibers, Polychlal fibers, Polynosic fibers and polypropylene fibers.

The section of the fibers is not limited. That is, it may be circular, rectangular, square, triangular, trapezoid, elliptic, or other polygonal shape. In addition, the fibers may be water-absorptive, water-repellent, adsorptive, electrostatic or electret fibers.

The element for wiping dust off the image receiving material may be a textile or knit material formed using yarns obtained by twisting bundles of such fibers. The textile or knit material may be of mixed fibers.

A variety of textiles of this type have been commercially available. Typical examples of them are as follows:

Toray Ind., Inc.
   Miraclation, (polyester 100%) Tracy (trade mark), (polyester 100%)
Teijin, Ltd.
   Microstar, (polyester 50%, nylon 50%)
Kanebo, Ltd.
   Krauzen (trade mark) MCF
Japan Vilene Co., Ltd.
   Bylene (trade mark)
Kuraray Co., Ltd.
   Kuremoneze A textile formed using synthetic fibers and electrically conductive fibers such as carbon fibers in combination may be employed. In this case, the textile can remove static electricity from the image receiving material 48 while being slid on the latter.

In the case where the image forming apparatus is of a type in which an image forming solvent is applied to the image receiving material 48, the textile may be used to wipe the photosensitive material 16. In the case where the image forming apparatus employs an image transferring operation carried out without an image forming solvent, the textile may be provided for both the image receiving material 48 and the photosensitive material 16 to wipe them.

The textile, whose synthetic fibers are 10 $\mu$m or less in diameter, should be arranged immediately before the position where the photosensitive material 16 is piled on the image receiving material 48 in such a manner that it is brought into contact with at least one of the materials 16 and 48. The textile thus arranged can completely remove from the material dust formed when the material is cut or dust floating in the apparatus. Hence, the image transferring operation is achieved satisfactorily at all times, and the resultant image is excellent in picture quality.

The image receiving material magazine 46 will now be described in more detail.

Figure 13:
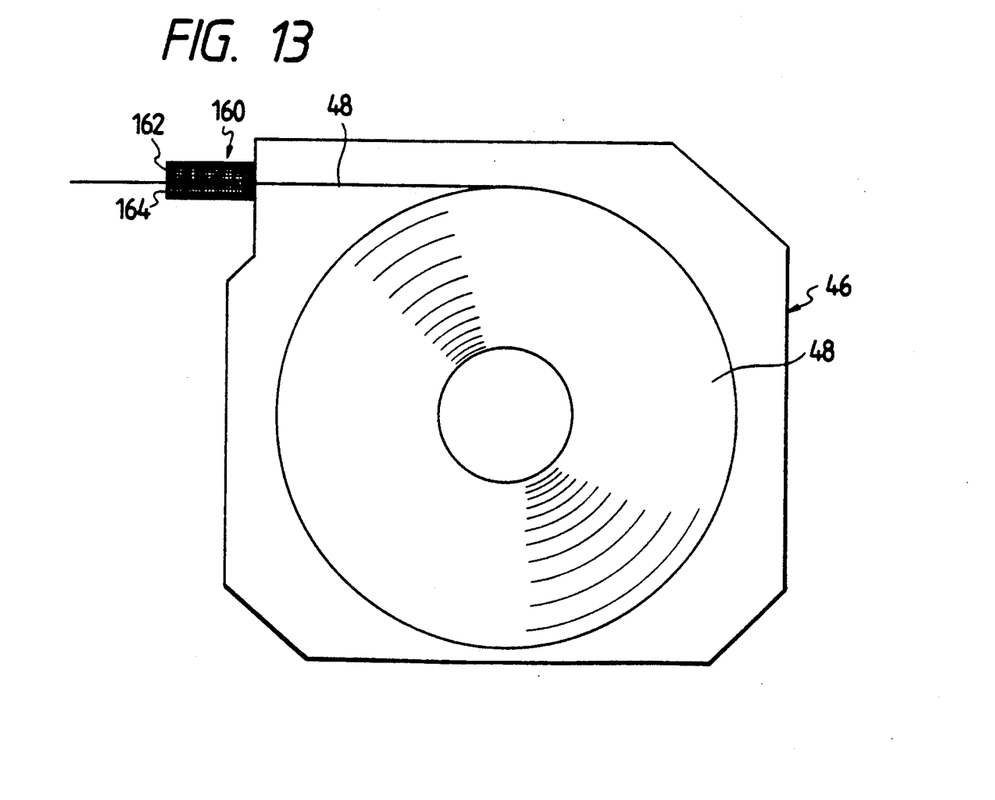
FIG. 13 is a sectional view of an image receiving material magazine.

FIG. 13 is a sectional view of the image receiving material magazine 46.

An image receiving material 48 in the form of a roll is loaded in the magazine 46. The image receiving material 48 is supplied by being pulled out of the magazine 46 through a slit-shaped image receiving material supplying outlet. Textiles 162 and 164 are provided on the inner wall of the image receiving material supplying outlet 160 in such a manner that they are brought into contact with respective sides of the image receiving material 48. That is, the textiles 162 and 164 are used to wipe the two sides of the image receiving material to remove dust, etc., therefrom in supplying the image receiving material 48. The textiles 162 and 164 are arranged above and below the passageway of the image receiving material 48 in such a manner that the gap between the textiles 162 and 164 is set to the extent that the image receiving material 48 can stably run while being in sliding contact with the textures. In addition, it should be noted that the textiles 162 and 164 are larger in width than the image receiving material 48 so that the latter is brought into sliding contact with the former in its entirety.

The textiles 162 and 164 are formed by plain-weaving or by weaving three-dimensionally yarns formed by twisting polyester fibers 2 $\mu$m in diameter. Hence, the sliding surfaces of the textiles 162 and 164 are slightly uneven, thus being able to positively remove fine particles, dust, etc.

The image receiving material 48 is pulled out of the image receiving material magazine 46 through the textiles 162 and 164 of the outlet 160 to a predetermined length by means of the supplying rollers, and then cut into a piece of image receiving material 48. Even if dust, etc., sticks to the image receiving material 48 in the magazine 46, the same will be removed from the image receiving material 48 by the textiles 162 and 164 as the latter is moved through the textiles 162 and 164 of the image receiving material supplying outlet 160. Therefore, no dust, etc., is found on the image receiving material 48 pulled out of the magazine 46. This promises a satisfactory image transferring operation.

The textile 162 provided at the outlet 160 of the magazine 46 for the image receiving surface of the image receiving material 48 is effective in removing dust, etc, therefrom. The textile 164 provided for the other surface of the image receiving material 48 is able to remove dust, etc, therefrom. Hence, dust, etc., stuck to the underside of the image receiving material will not be allowed to pass out of the image receiving magazine 46. Accordingly, the subsequent processes will be free from the effects of the dust, etc.

The photosensitive material magazine 14 in which the photosensitive material 16 is loaded is substantially the same in construction as the above-described image receiving material magazine 46. If in the magazine 14 the photosensitive material 16 is not sufficiently shielded from light because of the presence of the textiles 162 and 164, a light-shielding member of teremp, for instance, should be provided on either side of the textiles 162 and 164 to positively shield the photosensitive material from light in its magazine 14.

In the case where, in the photosensitive material magazine 14, a textile made of synthetic fibers 10 μm or less is provided at the supplying outlet in such a manner that it is brought into contact with the photosensitive surface of the photosensitive material 16, it removes dust, etc., from the photosensitive surface before the photosensitive material is supplied to the exposing section 20. Hence, the exposing region of the photosensitive material 16 is positively exposed in its entirety. Therefore, the resultant image is excellent in picture quality.

The fibers of the textiles 162 and 164 are the same as those of the textile 156 which is provided as a dust wiper for the above-described guide board 152 (FIG. 12).

A modification of the image receiving material magazine 46 and photosensitive material magazine 14 will be described with reference to FIGS. 14 and 15.

Figure 14:
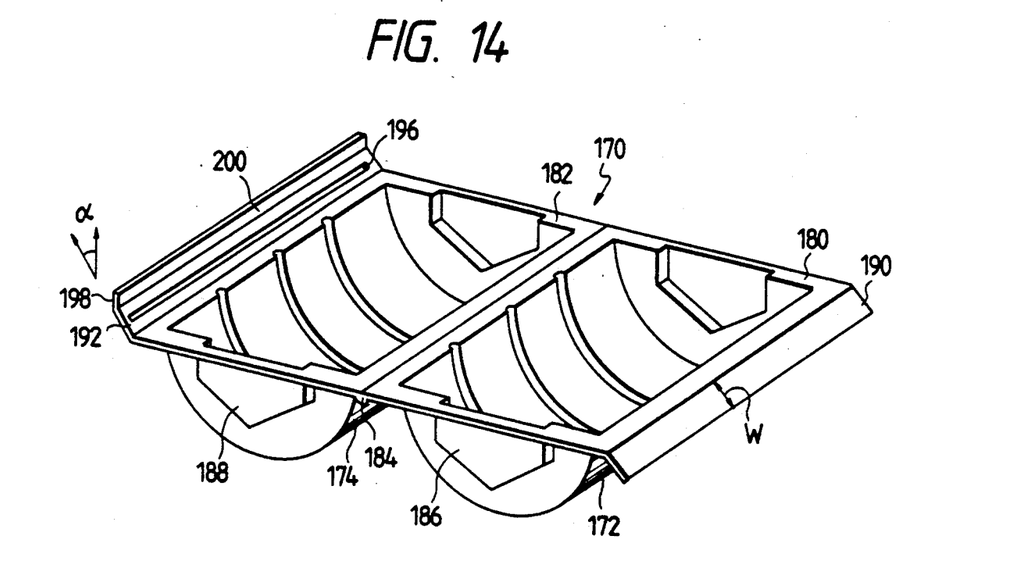
FIG. 14 is a perspective view of a photographing material magazine.
Figure 15:
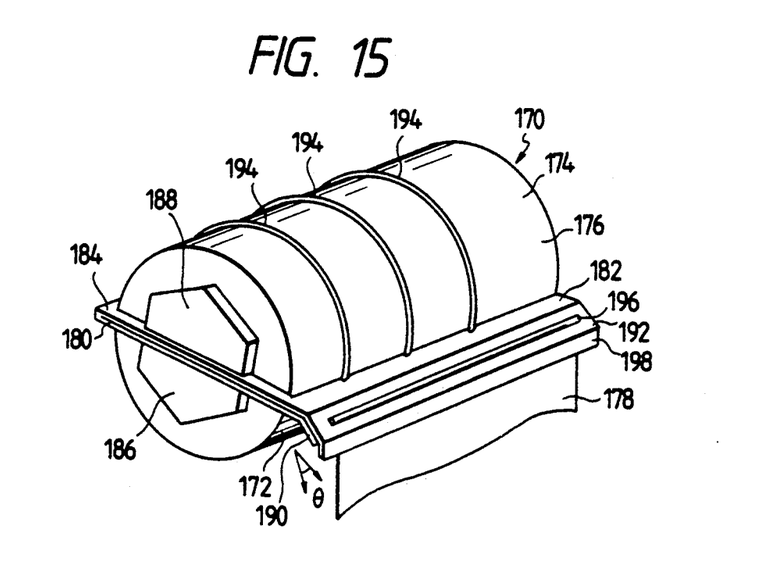
FIG. 15 is a perspective view of the photographing material magazine in which a photographing material has been loaded.

FIG. 14 is a perspective view showing a photographing material magazine 170, and FIG. 15 is also a perspective view showing the photographing material magazine 170 in which a photographing material has been loaded.

The photographing material magazine 170 is made up of a magazine body 176 which is formed by combining two casing halves 172 and 174 which are substantially symmetrical in configuration with each other in such a manner that they are swingable with respect to each other. A container for receiving the photographing material 178 in the form of a roll, that is, the magazine body 176, is formed by swinging the casing halves 172 and 174 towards each other.

The casing halves 172 and 174 are made of a thin plate 0.2 to 1.5 mm in thickness in such a manner that they form a chamber to receive the roll of photographing material 178 when put together.

More specifically, as shown in FIGS. 14 and 15, each of the casing halves 172 and 174 is so formed that it has an elongated inside space which is semicircular or semielliptic in section.

The casing halves 172 and 174 have flanges 180 and 182 which extend from their peripheries to facilitate the joining of the casing halves and the installation of the magazine.

The flanges 180 and 182 are connected together through a joint 184 of a hinge structure so that they are swingable towards each other.

The joint 184 may be formed simultaneously when the casing halves are molded. Alternatively, it may be formed by a conventional method after the casing halves are formed individually.

The casing halves 172 and 174, which are symmetrical with each other, have bearing sockets 186 and 188 which rotatably support the winding core of the roll of photographing material 178. The bearing sockets 186 and 188 are hexagonal.

As described above, the peripheral flanges 180 and 182 of the casing halves 172 and 174 are connected through the joint 184 to each other in such a manner that they are swingable towards each other. The casing halves 172 and 174 have ports 190 and 192 which extend from the flanges 180 and 182 symmetrically with respect to the joint 184. The ports 190 and 192 form a slot when the casing body is formed by closing the casing halves together. The slot thus formed is used to pull out the photographing material 178 therethrough.

The photographing material 178 is loaded in the magazine in the open state as shown in FIG. 14 by engaging the winding core with the bearing sockets 186 with the photographing material pulled out through the ports 190 and 192. Thus, the photographing material 178 can be readily loaded in the magazine, and its photographic characteristics will not be adversely affected when it is loaded in the magazine.

It is preferable that, when the winding core is engaged with the bearing sockets 186, an adhesive tape is used to hold the winding core in the bearing sockets.

After the photographing material 178 is loaded in the above-described manner, the symmetrical flanges 180 and 182 are joined together to provide the photographing magazine.

The flanges may be joined by a variety of conventional methods. For instance, they may be joined together using adhesive tape or hot-melt adhesive In order to align the flanges 180 and 182 with each other with ease, they may have a projection and a depression, respectively, which are engaged with each other.

The flanges 180 and 182 are bonded together by applying adhesive to their three surfaces or predetermined points in such a manner that the surfaces having the ports 190 and 192 provide a slot which is large enough to pull out the photographing material.

The flanges 180 and 182 can be mechanically joined together using a suitable jig or clamping members with the above-described clearance formed by the ports. However, since the provision of the ports 190 and 192 will eliminate the difficulties of it becoming impossible to pull the photographing material out of the magazine and to rewind the photographing material back into the magazine, it is preferable that the flanges 180 and 182 be bonded together with an adhesive. The photographing material magazine formed by bonding the flanges with adhesive can be handled and operated more readily.

The magazine thus constructed according to the invention eliminates the difficulties accompanying the conventional; photographing material magazine that the handling of it is rather troublesome and various troubles often occur with the photographing material when the magazine is handled.

It is preferable that, as described above, the internal space of the magazine be in the form of a cylinder which is circular or elliptic in section, so as to eliminate the difficulty of the photographing material buckling when the material is slackened in the magazine, making it difficult to pull the photographing material out of the magazine.

In the above-described embodiment, the casing body 176 is in the form of a cylinder; however, a rectangular casing body may be employed similarly to the prior art. In this case, it is preferable that curved inner wall members be provided inside the magazine at the corners.

The inner wall members may be made of a variety of materials such as cardboard and carton material. However, it is desirable that it be made of a plastic which can accept a predetermined curvature 1/1.5 to 1/18 of the inner diameter (r) of the magazine, preferably ½ to ¼.

It is of course necessary that the magazine be sufficiently high both in durability and in rigidity for the application at hand.

In order to meet this requirement, reinforcing ribs 194 are provided on the outer wall of the magazine body 176.

More specifically, the ribs 194 extend circumferentially of the magazine body 176, and have a width of 2 to 10 mm, preferably 4 to 6 mm, and a height of 1 to 4 mm, preferably 2 to 3 mm.

Recesses may be formed in the inner walls of the casing halves 172 and 174 in correspondence to the ribs 194 formed thereon. The ribs 194 may protrude either inwardly or outwardly.

It is preferable to form one to ten ribs 194 on the casing body, more preferably two to five ribs.

In the magazine 170 of the invention, in order to prevent the rewinding of the photographing material 178 into the magazine 170, the plate-shaped ports 190 and 192, substantially equal in width to the photographing material 178, are provided at the sides of the casing halves 172 and 174 which are opposite to the sides of the latter where the joint 184 of the flanges 180 and 182 of the casing halves 172 and 174 is formed.

In order to prevent the rewinding of the photographing material, the width (w) of the ports 190 and 192 is preferably in a range of 10 to 5 mm, more preferably in a range of 20 to 40 mm.

It is preferable that the ports 190 and 192 be formed so that, as shown in FIGS. 14 and 15, they extend from the flanges 180 and 182 forming an angle with the flanges 180 and 182. The angle $\theta$ of inclination is preferably 5 to 30°, more preferably 7 to 20°. The inclination of the ports 190 and 192 prevents the rewinding of the photographing material more positively.

The ports 190 and 192 extend obliquely downward in the direction of conveyance of the photographing material The upper port 192 functions to press down the photographing material, while the lower portion 190 functions to support it.

The photosensitive layer and the image receiving layer of the photographing material may be confronted with either of the ports.

Preferably, a rib 196 4 to 10 mm in width and 1 to 4 mm in depth is formed substantially in the middle of the upper port 192 to increase the elastic force pressing down the photographing material.

The elastic force can be increased by extending an elastic plate 198 from the outer edge of the upper port 192 in such a manner that it is bent downwardly at an angle $\alpha$ of 5 to 30° beyond the outer edge of the lower port 190.

In order to protect the photographing material from being scratched when pulled out of the magazine, preferably dust removing members 200 made of a textile such as teremp are bonded to the end portions of the ports 190 and 192.

With the dust removing members 200 made of textile, especially textile suitable for wiping the photographing material, the latter can be positively prevented from being scratched when pulled out, and dust can be removed from the surfaces of the photographing material with high efficiency. Thus, the provision of the dust removing members greatly contributes to an increase of the commercial value of the magazine.

The fibers of the textile forming the dust removing members are the same as those of the textile 156, that is, the same as the dust wiper provided for the guide board 152.

The textile may be bonded to both of the upper and lower ports, or to one of them. In the latter case, depending on the direction of winding of the roll of photographing material 178, the textile should be bonded to the port which is confronted with the coated surface of the photographing material (which is the surface on which the photosensitive layer or image receiving layer is formed).

The direction of winding of the roll of photographing material depends on the image forming apparatus. For instance, in the case where a roll of photographing material is supplied with the coated surface inside, the textile should be bonded to the lower port, and in the case where a roll of photographing material is supplied with the coated surface outside, the textile should be bonded to the upper port.

The angles $\theta$ and $\alpha$ of the ports 190 and 192 depend on the drawing torque of the nip rollers in the image forming apparatus, for instance. However, if those angles are excessively small, rewinding of the photographing material into the magazine is not prevented, and if they are excessively large, the frictional resistance of the ports against the photographing material passing through them is increased, as a result of which the photographing material may be scratched. Furthermore, the resistance is increased by the drawing torque of the nip rollers, so that it may become difficult to pull the photographing material out of the magazine, or it may become difficult to do so with high accuracy.

The magazine 170 may be formed using any material, such as paper, metal or plastic, which can be used for forming curved moldings. However, it is recommended to use plastic to form the magazine 170 because cardboard or carton material is low in durability, and the use of metal suffers from the difficulties that it is rather difficult to mold the magazine with metal, metal is higher in cost, and metal molding is affected in dimension by temperature changes.

It is preferable to use thermoplastic plastics. More specifically, it is desirable to use thermoplastic plastics softened at temperatures of 90 to 300° C. in a vacuum molding furnace, preferably at temperatures of 100 to 250° C., and more preferably at 150 to 210° C.

Examples of the thermoplastic plastics are polyethylene, crosslinked polyethylene, chlorinated polyethylene, ethylenevinyl acetate copolymer, polyethylene terephthalate, polypropylene, polyisobutylene, polyvinyl chloride, polyvinylidene chloride, polyvinyl acetate, polyvinyl alcohol, polyvinyl acetal, fluororesin, acrylic resin, polyacrylonitrile, polystyrene, acetal resin, polyamide, polycarbonate, cellulose plastics, styrene-acrylonitrile copolymer, and acrylonitrile-butagene-styrene copolymer. These plastics may be kneaded with a plasticizer such as synthetic rubbers.

Preferably, the photographing material magazine described above is formed using a conventional vacuum molding method by which the magazine can be readily formed at low manufacturing cost and in such a manner that it is small in wall thickness.

When the magazine is manufactured using a vacuum-molding thermoplastic resin, all the parts thereof are formed as one unit. Therefore, such a method is suitable for mass production of the magazine.

In the case of a conventional photographing material magazine, the rewinding of the photographing material into the magazine cannot be prevented without additionally providing an elastic member made of plastic or the like for the slot of the magazine. On the other hand, it should be noted that, in the magazine of the invention, the elastic member is molded integrally at the slot.

As is apparent from the above-description, in order to provide the magazine barrel and its end caps as one unit, and to provide the ports to prevent the rewinding of the photographing material in the magazine, it is most suitable to form the magazine by vacuum molding.

The magazine of the invention has been described with reference to the case where photographing material is loaded therein. However, it goes without saying that, when a photosensitive material is loaded in the magazine, it is necessary to shield it from light at all times.

As described above, in a photographing material magazine in which a roll of photographing material is loaded, the cylindrical magazine barrel and its end caps are formed as one unit by vacuum molding, and preferably elastic ports are provided at the outlet of the magazine, and ribs are formed on the magazine barrel. Hence, the magazine of the invention can be readily manufactured at low cost and can be handled with ease. Furthermore, the magazine is high both in durability and in rigidity, and it is free from the difficulty of the photographing material buckling during or before use, or it becoming impossible to pull out of the magazine.

In the image forming solvent applying device according to the invention, the guide member for guiding the recording material in the image forming solvent has ribs which are arranged in such a manner that the ribs extend obliquely with respect to the direction of movement of the recording material, and are allowed to wipe the whole area of the recording material at least once as viewed in the widthwise direction of the recording material (the direction perpendicular to the direction of movement of the recording material), and the end portions of the ribs are brought into sliding contact with the recording surface of the recording material Hence, as the recording material is moved, the whole recording surface of the recording material is brought into sliding contact with the ribs; that is, it is wiped with the end portions of the ribs. As a result, even if air bubbles or dust stick to the recording surface of the recording material, they are positively removed therefrom by the ribs.

Accordingly, the image forming solvent is positively applied to the entire recording surface of the recording material, and the resultant image formed thereon is excellent in picture quality.

What is claimed is:

1. An image forming solvent applying device for applying an image forming solvent to a recording material by immersing said recording material in said image forming solvent, comprising: means for providing a supply of solvent; a guide for guiding said recording material in said solvent, said guide having a plurality of ribs extending obliquely with respect to a direction of movement of said recording material, said ribs wiping an entire area of said recording material at least once as viewed in a widthwise direction of said recording material perpendicular to said direction of movement of said recording material as said recording material is conveyed along said ribs, and said ribs having end portions arranged to make sliding contact with a recording surface of said recording material.

2. The image forming solvent applying device of claim 1, wherein said guide comprises upper and lower guide members.

3. The image forming solvent applying device of claim 2, wherein said upper and lower guide members each have a plurality of said ribs, and said upper and lower guide members are arranged parallel to one another along an arcuate path.

4. The image forming solvent applying device of claim 3, wherein said ribs extend at an angle of less than 45° with respect to a direction of conveyance of said recording material.

5. The image forming solvent applying device of claim 3, wherein each of the ribs on said upper guide member are parallel to and vertically adjacent corresponding ribs on said lower guide member.

6. The image forming solvent applying device of claim 3, wherein said means for providing a supply of solvent supplies said solvent into a gap between said upper and lower guide members.

7. The image forming solvent applying device of claim 3, wherein said ribs are straight.

8. The image forming solvent applying device of claim 3, wherein said ribs are arcuate.

9. The image forming solvent applying device of claim 3, wherein said ribs are formed integrally with said upper and lower guide members.

10. The image forming solvent applying device of claim 3, wherein said ribs are semicircular in section.

11. The image forming solvent applying device of claim 3, wherein said ribs are triangular in section.

12. The image forming solvent applying device of claim 3, wherein said ribs are rectangular in section.

13. The image forming solvent applying device of claim 3, wherein said ribs of each of said upper and lower guide members are arranged so as to converge towards a center line of said guide members.

14. The image forming solvent applying device of claim 3, wherein said ribs of each of said upper and lower guide members are arranged in a crisscross pattern.

15. The image forming solvent applying device of claim 3, wherein said means for providing a supply of solvent comprises: a vessel containing solvent; a pipe for conveying said solvent between said vessel and holes formed in said lower guide member; and a filter disposed between said vessel and said lower guide member.

16. The image forming solvent applying device of claim 15, further comprising a hollow member mounted over an outlet of said pipe below said lower guide member, said filter being disposed over an upper end of said hollow member.

17. The image forming device of claim 15, wherein said filter has a mesh diameter of 3 mm or less.

18. The image forming device of claim 15, wherein said filter has a mesh diameter of 0.1 mm or less.

19. The image forming device of claim 15, wherein said filter is disposed over said holes in said lower guide member.

* * * * *